No. 679,233. Patented July 23, 1901.
W. W. LIND & J. C. McKEE.
APPARATUS FOR REMOVING AND SEPARATING BRAN FROM GRAIN.
(Application filed Oct. 12, 1900.)
(No Model.) 4 Sheets—Sheet 1.
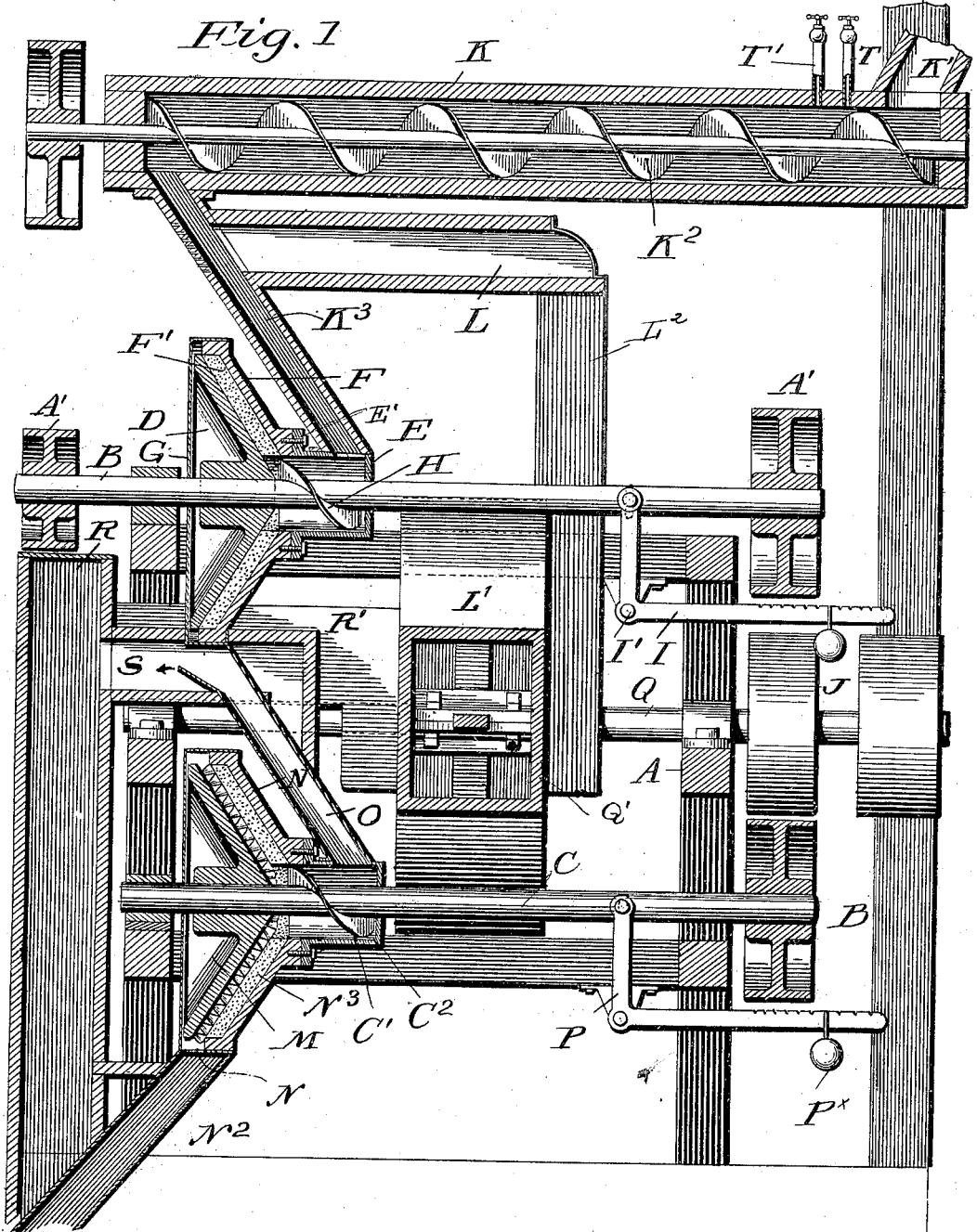

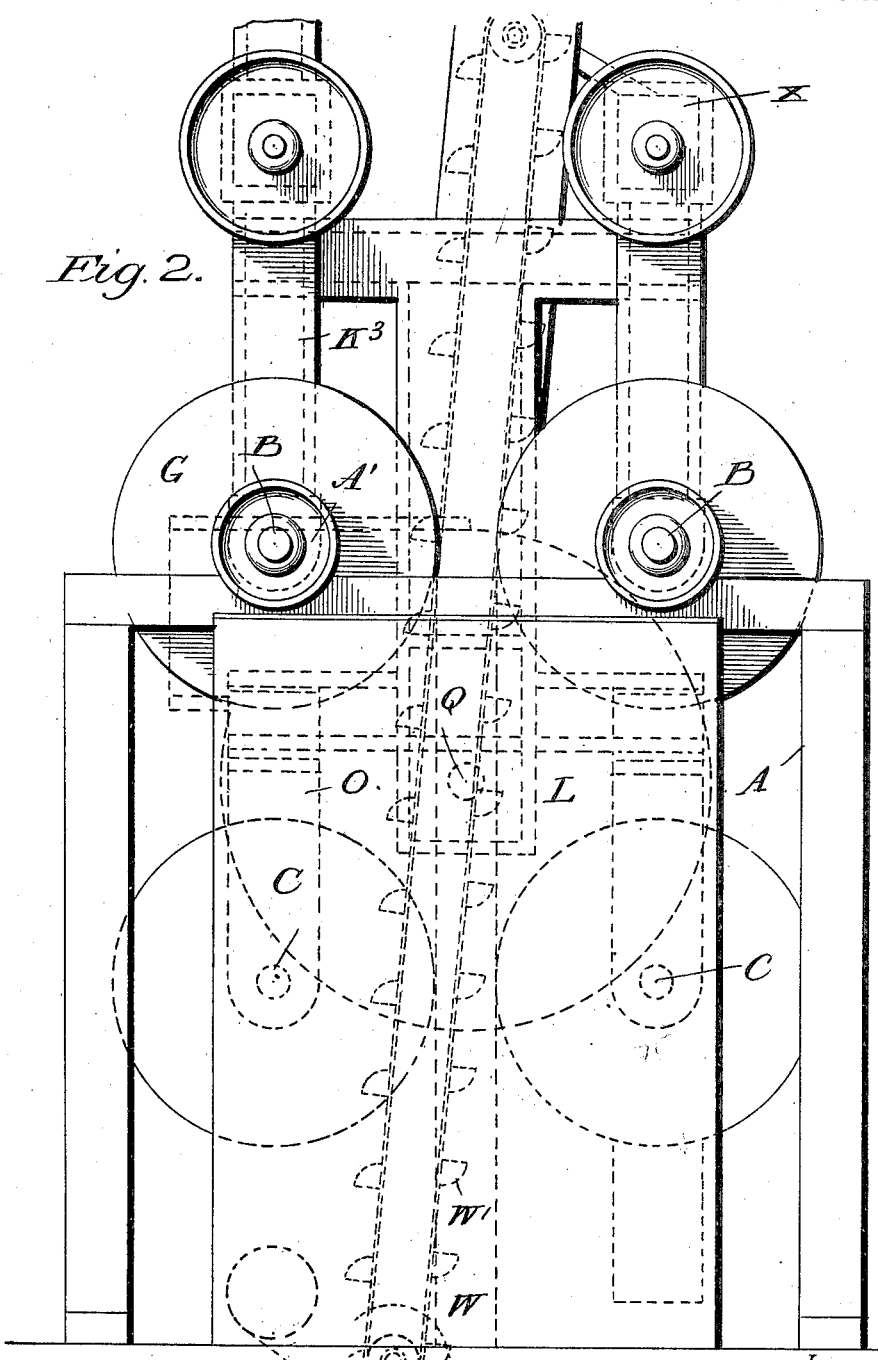

No. 679,233. Patented July 23, 1901.
W. W. LIND & J. C. McKEE.
APPARATUS FOR REMOVING AND SEPARATING BRAN FROM GRAIN.
(Application filed Oct. 12, 1900.)
(No Model.)
4 Sheets—Sheet 3.
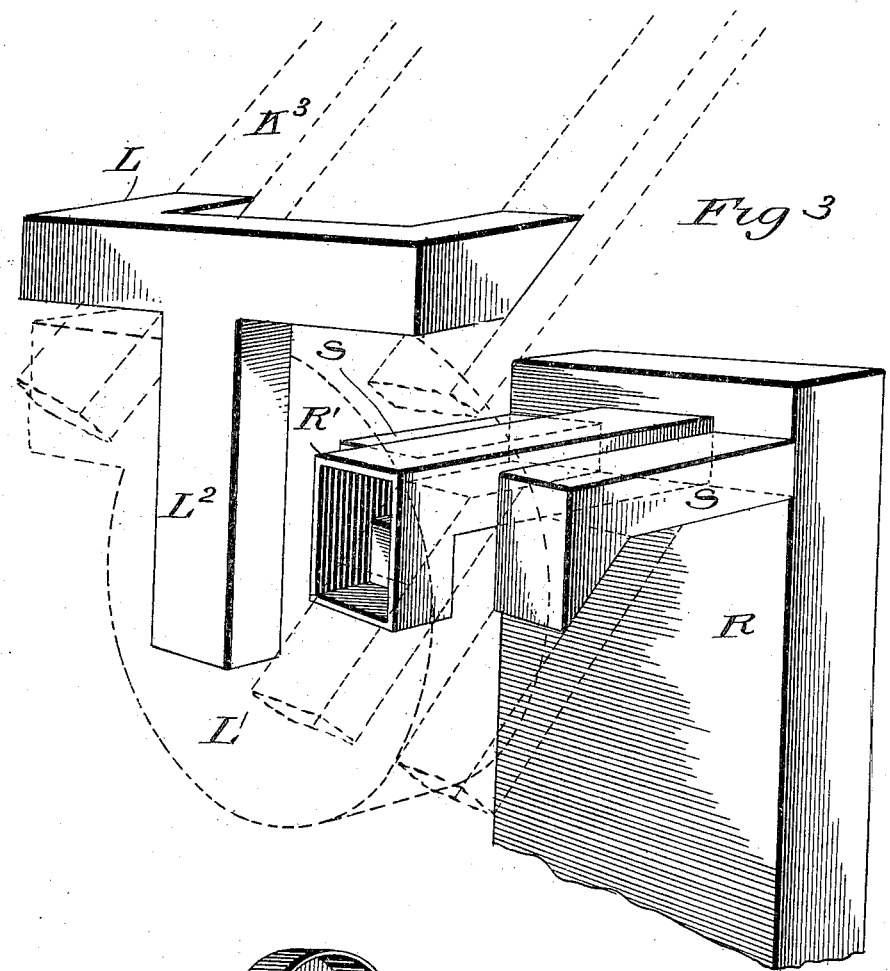
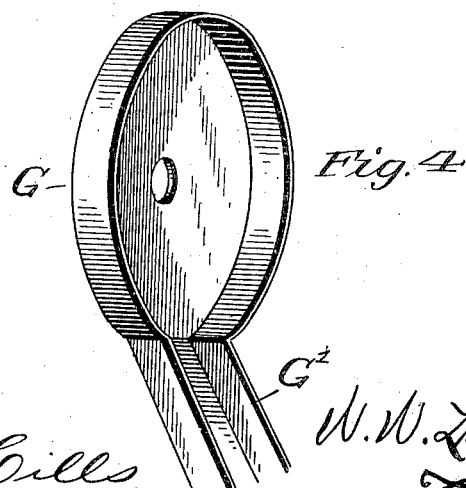

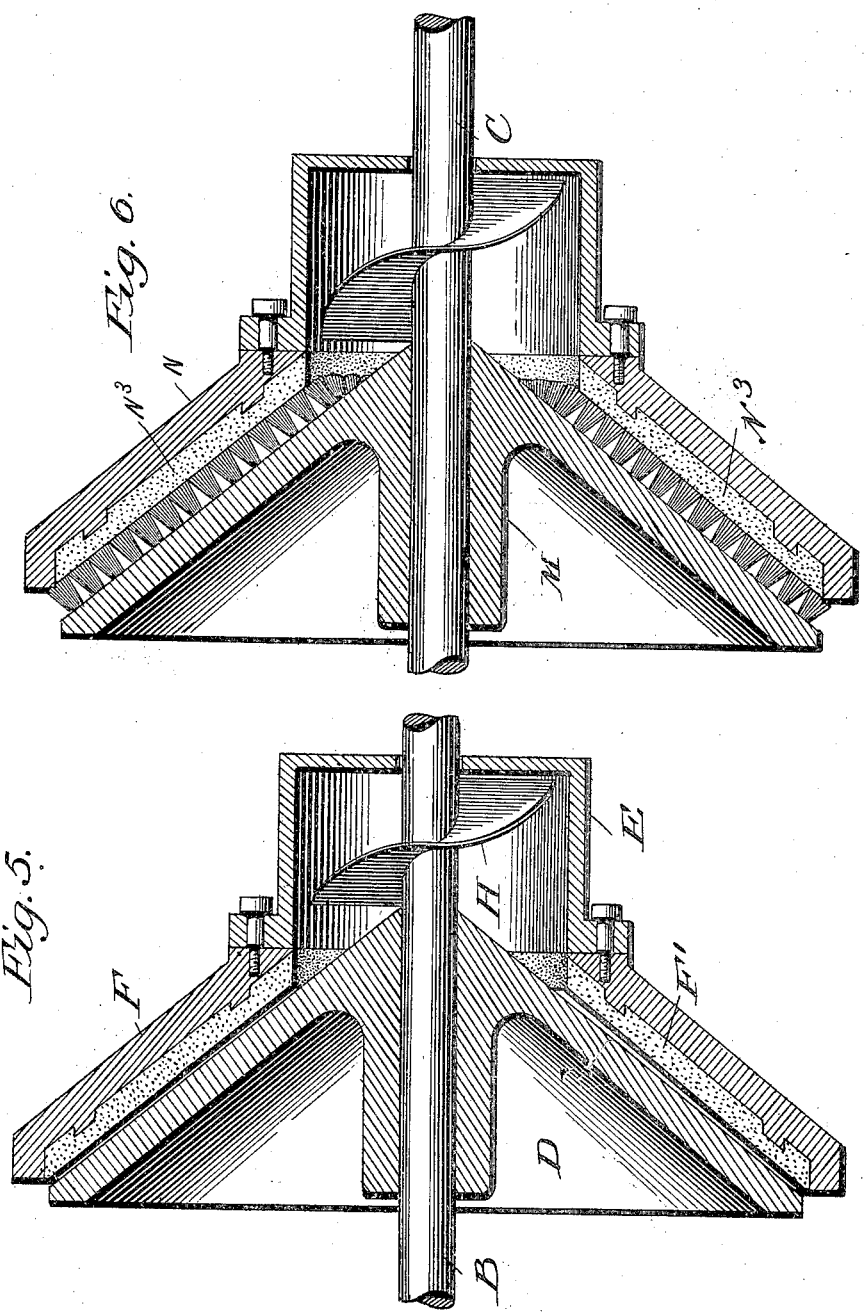

UNITED STATES PATENT OFFICE.

WILLIARD W. LIND AND JOSEPH C. McKEE, OF CALDWELL, IDAHO.

APPARATUS FOR REMOVING AND SEPARATING BRAN FROM GRAIN.

SPECIFICATION forming part of Letters Patent No. 679,233, dated July 23, 1901.

Application filed October 12, 1900. Serial No. 32,867. (No model.)

*To all whom it may concern:*

Be it known that we, WILLIARD W. LIND and JOSEPH C. McKEE, citizens of the United States, residing at Caldwell, in the county of Canyon and State of Idaho, have invented certain new and useful Improvements in Apparatus for Removing and Separating Bran from Grain; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful apparatus for treating cereals of various kinds for the removal of the bran from the kernels preparatory to their being reduced to the kind of produce desired.

The invention will be hereinafter more fully described and then specifically defined in the appended claims.

The invention is clearly illustrated in the accompanying drawings, which with the letters of reference marked thereon form a part of this application, and in which drawings similar letters of reference indicate like parts throughout the several views, in which—

Figure 1 is a vertical sectional view through our improved apparatus for removing the bran from grain. Fig. 2 is an end elevation, portions of the machine being shown in dotted lines. Fig. 3 is a perspective view of a portion of the apparatus, showing the fan-box and flues. Fig. 4 is a detail in perspective of a combined casing and spout for one of the sets of grain-scouring disks. Fig. 5 is an enlarged vertical sectional view of one set of disks; and Fig. 6 is a similar view through the second set of disks, in which one of the contact-surfaces is provided with brushes and the other with a semisolid material or felt.

Reference now being had to the details of the drawings by letter, A designates the frame of the apparatus, and B B and C C are shafts mounted in suitable bearings in said frame and provided with driving-pulleys A' and B'. The upper shafts B each has a conoidal disk D rotating therewith, made preferably of metal, and held stationary to the frame is a feed-box E, to the flanges E' of which is secured a concave disk F, to the outer concave face of which is secured a semirigid material F', preferably of felt, and G is a circular casing having an integral trough G', Fig. 4, through which the grain passes after the bran has been loosened and freed therefrom. The flange of said casing surrounds the outer circumferences of the concave disk D and the outer flanged portion of the disk F. Secured to the shaft B is a feeding-worm H, which is located in the box E, which is provided to feed the grain from the inlet end of the box to and between the two rubbing-surfaces of felt on the member F and the conical disk D. It is preferable that the shaft B have a slight longitudinal movement for the purpose of regulating the pressure between the felt or semisolid surface of the disk F and the metallic convex surface of the disk D. This longitudinal movement is regulated by means of the angle-lever I, pivoted at I' to the frame, one end of said angle-lever being pivotally connected to the shaft B with provision for a slight play, while the free end of the lever is notched and carries a weight J.

Horizontally disposed and forming a part of the framework of the apparatus is a trough or box K, having a spout K' leading therein at one end, and in the end walls of said trough or box is journaled a worm-shaft $K^2$, whereby the grain may be fed through said trough and into the trough $K^3$, leading from one end thereof. These troughs are steam-tight, and leading laterally from the trough $K^3$ is a suction-trough L, which leads to the fan-casing L' by way of the flue $L^2$.

On the lower shaft C is mounted a conical disk M, similar in construction to the disk D, with the exception of its inner face, which is provided with a series of brushes. (Clearly shown in the enlarged detail view, Fig. 6.) The shaft C has a worm C' for feeding the grain through the box $C^2$, which is similar to the box E, before described. A concave disk N is provided, which is secured to the flanges of the box $C^2$, and surrounding the outer circumferences of said disk M and the outer flange of member N is a circular casing N', which has leading therefrom a spout $N^2$. To the concave surface of the disk N is secured the semirigid material, preferably felt, $N^3$. Leading from the outlet end of the spout of the casing G is a flue or trough O, through which the grain passes from the outlet end of the casing G to and into the box C². The shaft C has pivotal connections with one end of an angle-lever P, which lever is pivoted at its angled portion, as at P', to the main frame, and the free end of the lever is notched and carries a weight P×. This arrangement is to regulate the pressure between the contact-faces of the felt N³ and the outer ends of the brushes.

Between the upper and lower shafts is mounted the shaft Q, on which the fan Q' is mounted. At one side of the frame is located a flue R, which has communicating therewith a flue R', Figs. 1 and 3, the inner end of said flue R' being connected to and communicating with the interior of the fan-casing. On either side of the flue R' is a suction-trough S, Fig. 3, one of said suction-troughs showing in Fig. 1, while the other trough communicates with the second set of bran separating or removing apparatus. (Shown in outline in Fig. 2.)

Leading into the trough or box K are the steam and water ports T and T', through which water or steam may be introduced into the trough accordingly as may be desired for the debraning of the various kinds of grain. In Fig. 2 of the drawings is shown two series of similarly-constructed concave and convex disks, as illustrated in Fig. 1 of the drawings, and mounted between each set of disks is an endless chain W, rotating over suitable pulleys and provided with buckets W', whereby the grain after having the outer scale or bran removed by passage through the first set of disks may be elevated and dumped into a feeding-trough X, which is similar to the trough K shown in Fig. 1 and in which the grain is treated in a similar manner as in the first set of dehulling apparatus for the removal of the second or inner scale of bran from the kernels of the grain.

In operation the wheat or other grain from which it is desired to remove the bran is fed into the trough K, into which steam or water is introduced as the condition or kind of grain may require to thoroughly saturate the first or outer scale of the bran. The grain is fed by the worm into the outlet-trough K³, which is steam-tight, and in the passage of the grain through the spout K it is acted upon by a strong suction from the fan through the flue L for the purpose of removing all of the surplus moisture, which causes the saturated bran to expand or swell. This expanding of the bran releases itself from the second or inner layer of bran, which is afterward removed from the kernels. The grain being thus treated passes into the feed-box E, from which it is fed by the worm H to and between the adjacent faces of the conical disk D and the semirigid or felt surface, which is mounted upon the concave disk F, and by a rotary contact of the disk D, which forces the grain against the felt, the outer covering of bran will be broken by the rubbing action of the two surfaces and held away from the bodies of the kernels. The grain passing from the outlet of the casing surrounding the conical disk and felt surface proceeds thence into the trough O, being acted upon as it enters said trough by means of a suction-current in the flue S, said current being provided to withdraw the bran from the grain. The grain being thus separated from the loose particles of bran passes through the trough O and into the box C², from which it is fed to and between the disk M, having a series of brushes upon its convex surface and the semisolid surface of the disk N. The grain passing between the two surfaces—namely, brushes and soft felt—any remaining loose particles of bran which cling to the kernels after passing between the semi rigid and solid disk surfaces will be removed from the kernels of the grain, after which the debranded kernels pass through the chute or trough N², thence to the conveyer W, by which the grain is raised and deposited in a trough X. (Shown in Fig. 2 of the drawings.) The grain thus passing through the two sets of rotary disks for removing the outer surface is in readiness to be similarly treated by passing through a similarly-arranged apparatus, whereby the inner or second covering of bran may be removed from the grain to prepare the same for its reduction into the kind of produce desired. By means of the weighted members, which are mounted on the angle-levers pivoted to the shafts, it will be noted that the pressure of the conical surfaces of metal and brushes against the kernels held in contact with the semisolid or felt surface may be easily regulated.

From the foregoing it will be noted, that the grain is tempered by the use of water or steam, and the bran or woody matter which is of a fuzzy and feathery nature when ground with the whole grain, and causes fine particles of the glutinous matter composing the inner portions of the kernels to adhere to it, and which goes into a low grade of stock, by our machine is thoroughly removed, thus saving a large waste of flour of the finest quality, which by other mills goes into the lower grade of stock.

Having thus described our invention, what we claim to be new, and desire to secure by Letters Patent, is—

1. A grain-scourer, consisting of a machine having two sets of conoidal disks, one disk in each set being stationary, and provided with a facing of semirigid material, the second disk in one set being rotatable, and having a solid surface adjacent to the semirigid facing, the second disk of the other set being rotatable, and having a brush-surface, and means for conveying the grain from one set of disks to the other, as set forth.

2. A grain-scourer, consisting of a set of conoidal disks, one having a solid surface and rotatable, the other being stationary, a semirigid facing on the concave surface of said stationary disk, a second set of conoidal disks, one being rotatable and having a brush-surface, the other being stationary, and having a semirigid facing, a grain-moistening box, conveying means between said box to and through the sets of disks, and pneumatic apparatus for removing the moisture and bran from the grain as it passes through the machine, as set forth.

3. In a grain-scourer, the framework, two longitudinally movable and rotatable shafts mounted therein, two sets of conoidal disks, one disk of one set mounted to rotate with one of said shafts, the adjacent disk having a facing of semirigid material on its concave face, one disk of the other set rotating with the second shaft and having a covering of brushes, and its adjacent disk stationary and having its concave face covered with a semirigid facing, a receptacle in which the grain is steamed or soaked, a conveyer therein, communicating passage-ways between said receptacle and sets of disks, feed-worms on said shafts, and pneumatic means for withdrawing moisture and bran from the passage-ways as the grain passes through the machine, as set forth.

In testimony whereof we affix our signatures in presence of two witnesses.

WILLIARD W. LIND.
JOSEPH C. McKEE.

Witnesses:
R. W. SWEET,
WALTER GRIFFITHS.